United States Patent
Lee

(10) Patent No.: US 7,349,784 B2
(45) Date of Patent: Mar. 25, 2008

(54) CONTROL METHOD FOR AUTOMOBILE TRANSMISSIONS

(75) Inventor: Jung-Suk Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 653 days.

(21) Appl. No.: 10/750,660

(22) Filed: Dec. 31, 2003

(65) Prior Publication Data
US 2005/0010349 A1    Jan. 13, 2005

(30) Foreign Application Priority Data
Jul. 10, 2003   (KR) .................. 10-2003-0046675

(51) Int. Cl.
*F16H 61/00* (2006.01)
*G06F 17/00* (2006.01)

(52) U.S. Cl. ................. 701/62; 701/51; 701/64; 477/116; 477/126

(58) Field of Classification Search .......... 701/51, 701/62, 64, 95, 67; 192/219.1, 3.58; 477/125, 477/126, 110, 79, 116; 475/119, 133
See application file for complete search history.

(56) References Cited
U.S. PATENT DOCUMENTS

| 5,088,353 A | | 2/1992 | Yoshida | |
|---|---|---|---|---|
| 5,487,004 A | * | 1/1996 | Amsallen | 701/51 |
| 5,609,067 A | * | 3/1997 | Mitchell et al. | 74/336 R |
| 5,828,974 A | * | 10/1998 | Hawarden et al. | 701/64 |
| 6,094,612 A | * | 7/2000 | Holbrook et al. | 701/63 |
| 6,125,316 A | * | 9/2000 | Sasaki et al. | 701/62 |
| 6,782,961 B1 | * | 8/2004 | Ishikawa et al. | 180/197 |
| 6,950,736 B2 | * | 9/2005 | Cho | 701/62 |
| 2002/0035000 A1 | * | 3/2002 | Saito | 475/127 |
| 2002/0087239 A1 | * | 7/2002 | Kwon | 701/34 |

FOREIGN PATENT DOCUMENTS

| DE | 3843101 A1 | 7/1989 |
|---|---|---|
| JP | 62151656 | 7/1987 |
| JP | 07301324 A | 11/1995 |
| JP | 10-61762 | 3/1998 |
| JP | 11280882 | 10/1999 |
| JP | 2000240785 | 9/2000 |
| JP | 2003097692 | 4/2003 |

* cited by examiner

*Primary Examiner*—Thomas Black
*Assistant Examiner*—Christine M Behncke
(74) *Attorney, Agent, or Firm*—Morgan Lewis & Bockius LLP

(57) ABSTRACT

A control method for automatic transmissions wherein a reverse motion condition in the neutral or drive ranges, caused by burning or the like in the operating devices of the automatic transmission, can be automatically detected to prevent an unwanted reverse motion of a vehicle from occurring, thereby enhancing the safety of the automatic transmission and improving the running stability of the vehicle.

3 Claims, 1 Drawing Sheet

CONTROL METHOD FOR AUTOMOBILE TRANSMISSIONS

CROSS-REFERENCE TO RELATED APPLICATIONS

This application claims priority of Korean Application No. 10-2003-0046675, filed on Jul. 10, 2003, the disclosure of which is incorporated fully herein by reference.

FIELD OF THE INVENTION

The present invention relates to a control method for automobile transmissions and, more particularly, to a control method for preventing unwanted backward motion generated by erroneous operation of an automatic transmission.

BACKGROUND OF THE INVENTION

Generally, an automatic transmission serves to convert a power input into a torque converter to an appropriate transmission ratio by way of an epicyclic gear. In order to automatically form the appropriate transmission ratio, an operating device is equipped comprised of clutches and brakes for selectively activating an input element, an output element and a reaction element of the epicyclic gear. The operating device is controlled by a hydraulic control device and an electronic control device.

If a burning occurs at an operating element such as a clutch or a brake comprising an operating device of an automatic transmission, the epicyclic gear does not properly operate, resulting in an erratic transmission state. A worst case scenario that could occur in the epicyclic gear is an occurrence of an unwanted backward transmission state in the neutral or drive range.

SUMMARY OF THE INVENTION

Embodiments of present invention provide a control method for automobile transmissions adapted to automatically detect a formation of backward transmission state in N or D range generated when an erroneous operation occurs at an operating device of the automatic transmission due to burning or the like to prevent an unwanted backward motion of a vehicle and to thereby improve stability of the automatic transmission.

In accordance with an embodiment of the present invention, a control method for automobile transmissions comprises: (a) determining whether an engine is operating; (b) checking a shift range selection state of a shift lever when an engine is in a normal operation; (c) determining whether common operating elements that are commonly operating at N, D and R ranges are operating when the shift lever is in N or D range, or in the midst of N-D change; (d) calculating an inspection speed by multiplying an output axle speed of automatic transmission by a reversing gear ratio when the common operating elements are operating; (e) determining whether a state of a difference between an input axle speed of the automatic transmission and the inspection speed being within a predetermined scope is being maintained for a predetermined period of time; and (f) stopping an operation of the common operating elements when it is determined that a vehicle is reversing as a result of determination at (e).

BRIEF DESCRIPTION OF THE DRAWING

The above and other objects, features and other advantages of the present invention will be more clearly understood from the following detailed description taken in conjunction with the accompanying drawing.

DETAILED DESCRIPTION OF THE INVENTION

Figure 1:
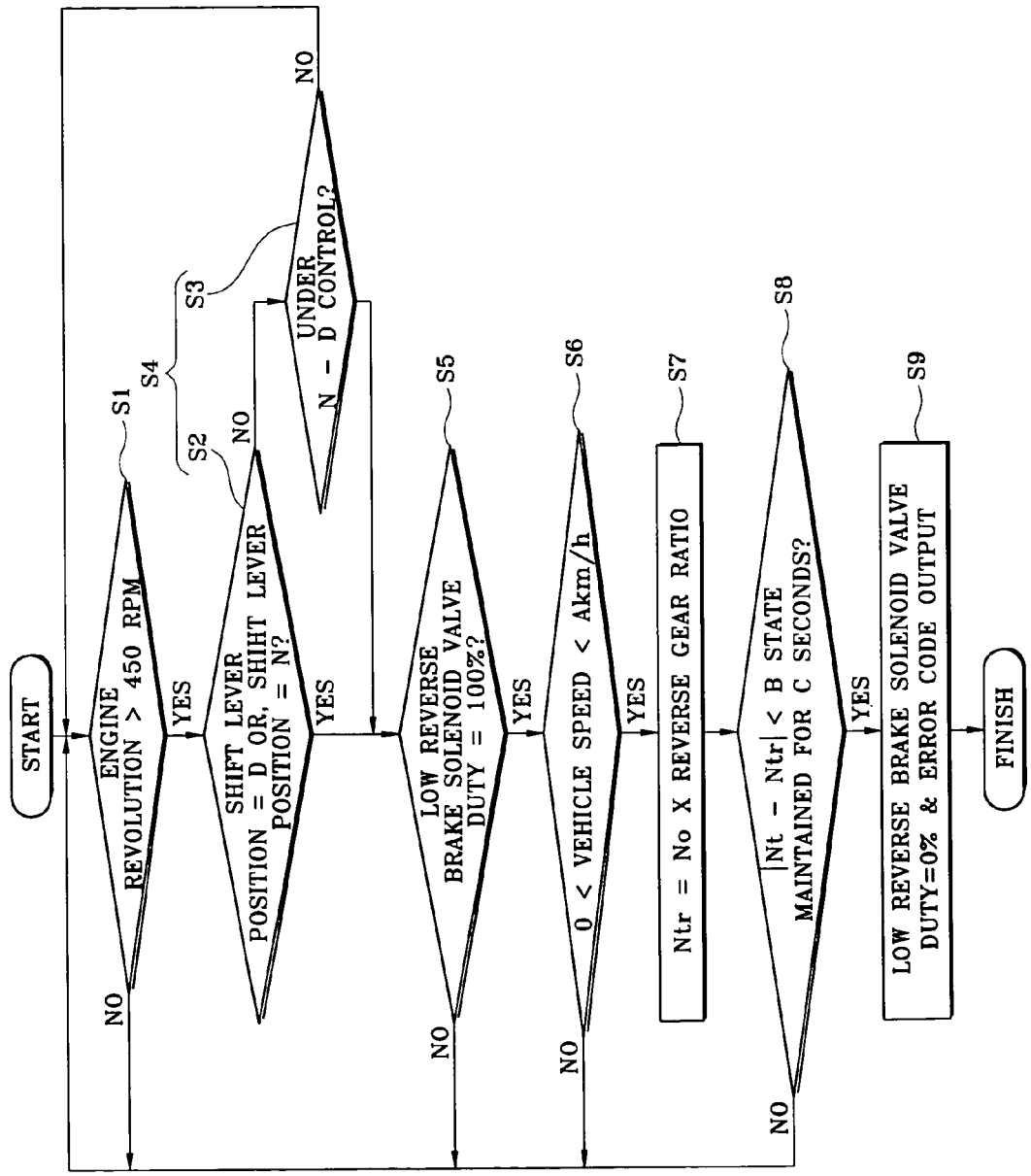
FIG. 1 is a flow chart for illustrating a control method of an automatic transmission according to an embodiment of the present invention.

The preferred embodiment of the present invention will now be described in detail with reference with the annexed drawing. It should be noted that operating elements for embodying each shift range state in the present embodiment will be described with reference to an automatic transmission in operation mode, as shown in TABLE 1.

TABLE 1

| | Under clutch | Overdrive clutch | Second brake | Low reverse brake | Reverse clutch | Reduction brake | Direct clutch |
|---|---|---|---|---|---|---|---|
| P | | | | ● | | ● | |
| R | | | | ● | ● | ● | |
| N | | | | ● | | ● | |
| First speed | ● | | | ● | | ● | |
| Second speed | ● | | ● | | | ● | |
| Third speed | ● | ● | | | | ● | |
| Fourth speed | ● | ● | | | | | ● |
| Fifth speed | | ● | ● | | | | ● |

When there occurs an unwanted reverse shifting state at N or D range in the automatic transmission controlled under the above conditions, it can be said that the reverse clutch is burnt.

FIG. 1 is a flow chart for illustrating a control method of an automatic transmission according to an embodiment of the present invention, where S denotes a step. The following is a sequential order of a Transmission Control Unit (TCU) carrying out the control according to the present invention when the reverse clutch is burnt as described above.

First, a determination is made as to whether an engine is operating at 450 rpm or more and as to whether the engine is normally operating (S1).

As a result of the discrimination at S1, if the engine is operating in a normal condition, a discrimination is made as to what shift range a shift lever has selected. In other words, in the present embodiment, a step of determining in which range the shift lever is, that is, in N range or in D range is carried out (S2). As a result of the determination at S2, if the shift lever is neither in N range nor in D range, a step of determining whether the shift lever is in the midst of N-D change control is further performed (S3).

As a result of the determinations at step S2 and S3, if the shift lever is in N or D range, or in N-D shifting step, a step of determining whether common operating elements that commonly operate in N, D and R ranges are being activated is effected (S5). In the automatic transmission having characteristics of TABLE 1 used in the present embodiment, the low reverse brake is commonly activated in P, R and N ranges and first speed of D range such that the low reverse brake can be a common operating element.

For determining whether the low reverse brake of the common operating element is operating, a method of determining whether the operating duty cycle of the low reverse brake solenoid valve is controlled at 100%.

If it is determined at S5 (operating element checking step) that the low reverse brake is being activated, the TCU determines whether the vehicle is running at a predetermined speed (S6). An inspection speed calculating step (S7) is carried out only if the vehicle speed is larger than zero but within a prescribed A km/h. This is because, when a vehicle speed is larger than a prescribed speed of A km/h, control for prompting the TCU to automatically release the low reverse brake has been already performed. The prescribed speed of (A) km/h can be changed in response to the type of transmission, and the prescribed speed of (A) km/h is the vehicle speed designated for the TCU to automatically release the low reverse brake.

If the vehicle speed is larger than zero under a vehicle speed condition of the low reverse brake not automatically being released, the TCU multiplies the output axle speed of the automatic transmission (No) by reverse gear ratio to obtain an inspection speed (Ntr) (S7). In other words, an inspection speed calculating step is carried out (S7).

Next, the TCU uses the inspection speed obtained in the above step to determine whether a difference between the input axle speed (Nt) and the inspection speed (Ntr) within a predetermined range is maintained for a prescribed period of time. In other words, a reverse motion checking step (S8) is performed. This is because, if the inspection speed (Ntr) obtained by multiplying the output axle speed (No) by the reverse gear ratio is identical to the input axle speed (Nt), a current condition formed by the automatic transmission is determined as a reverse shift state. In consideration of a detection error of the input axle speed (Nt) and the output axle speed (No), it can be ascertained that a reverse motion is being effected if a difference between the input axle speed (Nt) and the inspection speed (Ntr) at less than a predetermined value (B) is maintained for a prescribed period of time (C).

Of course, the predetermined value (B) and the prescribed period of time (C) are determined in consideration of the detection error and stability, such that the value is experimentally or interpretatively, and appropriately determined per each automatic transmission.

If it is determined at S8 (reverse motion checking step) that the vehicle is driven in a reverse direction, a reverse motion stopping step (S9) to stop the operation of the low reverse brake, which is the common operating element, is carried out. In a preferred embodiment, it is embodied by a method of setting an operating duty cycle of the low reverse brake solenoid value at zero %.

Furthermore, although in the present embodiment, the reverse motion is automatically stopped and the TCU outputs an error code at the same time, it should be apparent that an error report function of blinking a warning light on an instrument panel at a driving seat and the like can be also effected.

As apparent from the foregoing, there is an advantage in the control method for an automatic transmissions thus described according to the present invention in that a reverse motion condition at N or D range caused by burning or the like at operating devices of the automatic transmission can be automatically detected to prevent an unwanted reverse motion of a vehicle from occurring, thereby enhancing the safety of the automatic transmission and improving the running stability of the vehicle.

What is claimed is:

1. A control method for an automatic transmission, comprising:
    determining whether an engine is operating;
    checking a shift range selection state when the engine is in a normal operation;
    determining whether operating elements that commonly operate at N, D and R ranges are operating when said shift range is in N or D range, or in the midst of N-D change;
    calculating an inspection speed by multiplying an output axle speed of the automatic transmission by a reversing gear ratio when said common operating elements are operating;
    determining whether a difference between an input axle speed of the automatic transmission and the inspection speed is within a predetermined range for a prescribed period of time; and
    stopping operation of the common operating elements when it is determined that a vehicle is reversing as a result of the determination in, the previous step.

2. The method as defined in claim 1, wherein the range checking step comprises:
    ascertaining whether said shift range is in N range or D range; and
    ascertaining whether said shift range is in the midst of N-D change control.

3. The method as defined in claim 1, further comprising a step of determining whether the vehicle is running at a predetermined speed between the operation element checking step and the inspection speed calculating step, and carrying out the inspection speed calculating step if the vehicle speed is within a predetermined speed.

* * * * *